Jan. 1, 1952
E. V. MURPHREE
2,581,130
PROCESS FOR CONVERTING CARBOHYDRATES
INTO BITUMINOUS SUBSTANCES
Filed Sept. 10, 1947
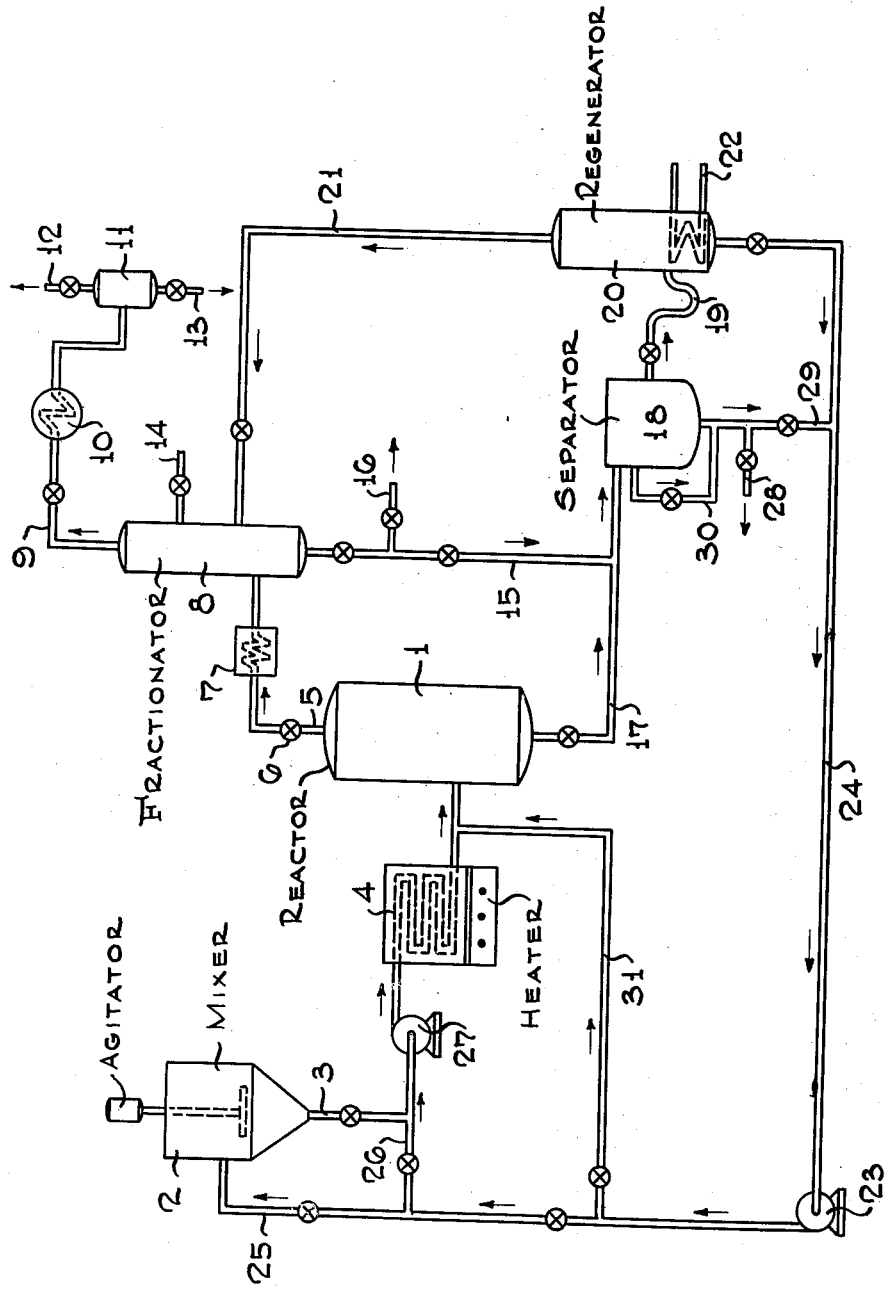
Eger V. Murphree Inventor
By P. L. Young Attorney

UNITED STATES PATENT OFFICE 2,581,130

PROCESS FOR CONVERTING CARBOHYDRATES INTO BITUMINOUS SUBSTANCES

Eger V. Murphree, Summit, N. J., assignor to Standard Oil Development Company, a corporation of Delaware Application September 10, 1947, Serial No. 773,164

1 Claim. (Cl. 260—212)

This invention relates to an improvement in the process of converting highly oxygenated organic compounds, such as carbohydrates, into pyrobituminous pitch by treatment with an aqueous alkaline solution of controlled alkalinity.

More particularly, this invention relates to an improved process for the formation of pyrobituminous substances which can be readily converted into asphaltic and petroleum-type bituminous substances.

Bituminous substances are substances resembling native bitumens, which are substances of variable color, hardness and volatility, composed principally of hydrocarbons, nearly free from oxygenated bodies, sometimes associated with mineral material, the non-mineral constituents being fusible and largely soluble in carbon disulfide.

Asphalts are a species of bitumen of dark color, variable hardness, comparatively non-volatile, composed principally of hydrocarbons, nearly free of oxygenated bodies, containing little or no crystallizable paraffins, sometimes associated with mineral matter, the non-mineral constituents being easily fusible and largely soluble in carbon disulfide.

At the present time a comparatively small number of distinct chemical substances have been identified in bituminous complexes. Little is known regarding the numerous non-mineral molecular substances present in native asphalts and other bitumens.

The chemistry of the bituminous substances is further complicated by the fact that commercial specimens are rarely alike in composition. Two shipments from different places or even the same place may differ in composition or physical properties. Bituminous substances cannot, therefore, be compared with vegetable and animal fats and oils which, in the case of any given material, will run fairly uniform in composition and physical properties. Asphalts find wide and varied use in industry because of their general nature and the refiner's ability to process them readily to have the qualities desired for specific application. Their inherent properties permit them to be used in paint, waterproofing and paving materials.

The asphalts, besides being of considerable present value for further chemical manufacture, possess great potential value because they can be converted by pyrolytic treatment and hydrogenation to hydrocarbons of the types found in the lighter and more valuable petroleum products.

Investigations have previously been made for converting carbohydrates to materials of good conversion characteristics by treating the carbohydrates under pressure with water in the presence of alkaline reagents. The products obtained have varying carbon contents and range from fairly fluid to soft, viscous, greasy materials all with relatively high hydrogen contents. The latter substances are pitches or bituminous tars that resemble natural asphalts, and have relatively higher hydrogen contents than do coke-like materials often obtained by conversion of carbohydrates.

Now, it is understood that maintenance of alkalinity in the treating solution is important for obtaining the type of products desired. If the solution shifts from the alkaline to the acidic region excessively carbonized coal-like materials are produced. The yield of products with high hydrogen-to-carbon ratios diminishes as the alkalinity of the treating medium is neutralized. When suitable pressure, temperature and alkalinity are secured, the oily products obtained can be destructively distilled to form asphalts, and even a considerable amount of oily hydrocarbons boiling below 125° C.

The course of the reaction, whereby carbohydrate, cellulosic, and to some extent, lignitic substances, are converted to pyrobituminous substances, is regarded as comprising the following stages:

(1) Partial decomposition of the carbohydrates by alkali, e. g., one normal solution of alkali metal hydroxide, or alkali or metal carbonate;

(2) Conversion of the carbohydrate fragments to intermediates by elimination of oxygen as $CO_2$ and $H_2O$;

(3) Conversion of the intermediates to bituminous substances by polymerization or condensation reactions.

It will be understood that one of the functions of the alkali is to promote elimination of part, and only part, of the oxygen as $CO_2$ instead of $H_2O$, elimination of all as $H_2O$ leading to formation of coke only, and as $CO_2$ of $CH_4$ only, neither of which is desirable.

In the final stages of the conversion, intermediate products including phenolic compounds, naphthenic acids, and other less oxygenated compounds are formed.

Considerable gas is evolved during the formation of the new substances. Analysis reveals that the evolved gaseous material comprises carbon dioxide, water vapor, and volatile organic compounds.

During the reaction, carbon dioxide should be eliminated in large quantities, preferably as fast as it is formed. Even though part of the carbon dioxide is removed with other gaseous products, a sufficient amount of this carbon dioxide reacts with the alkali, whether it be in the form of caustic hydroxide or carbonate, in the aqueous treating medium to convert the alkali to the bicarbonate, and this combined carbon dioxide has to be removed from the reaction zone, also. By withdrawing the aqueous treating solution for regeneration of the carbonate, the regenerated treating solution may be recycled to the reaction zone, thus keeping the treating solution at a high alkaline strength. The spent alkali solution of lowered capacity, due to its bicarbonate content, is regenerated by being kept at a high temperature under reduced pressure in a regeneration zone wherein carbon dioxide is given off as the bicarbonate is converted to normal carbonate. It is advantageous to regenerate the spent alkali solution after it is segregated from any emulsion with the organic oily substances of the original reaction product.

Conditions favorable for obtaining conversion of the carbohydrate substances to pyrobituminous substances are temperatures in the range of 275–375° C., pressures in the range of 100–1000 atmospheres, and a reaction period of from about ½–8 hours. The requirement of the long reaction period gives rise to the problem of using a continuous-type procedure for operation on a practical scale. In a continuous operation the average contact time should be of the order of ½ hour or less.

Having outlined the process of this invention in a general manner, further specific details will be explained with reference to the accompanying drawing which schematically illustrates in a flow diagram means and steps used in carrying out a preferred embodiment of this invention.

In the flow diagram, 1 represents a high temperature, high pressure reaction chamber into which a cellulosic carbohydrate macerated in aqueous caustic alkali solution, e. g., sodium hydroxide or sodium carbonate solution, is charged from a mixing tank 2. The charge mixture from tank 2 flows through line 3 for preheating in an externally heated coil 4 to about the desired reaction temperature. Feed-product heat exchangers may be employed in the preheating after starting up the unit.

When the charging period has approximately ended and during the course of the reaction started in chamber 1, considerable gaseous material including carbon dioxide, water vapor and low boiling hydrocarbons is evolved and taken overhead from the reaction chamber 1 through line 5 controlled by means of pressure reducing valve 6.

The gaseous material withdrawn from the reaction chamber 1 is cooled in passing through heat exchanger 7 then discharged into a separation zone or fractionator 8. Uncondensed vapor and gases are withdrawn overhead from the separtion zone 8 through a valve controlled line 9, then are passed through cooling coil 10 into receiver 11, which has a gas outlet 12 for removal of hydrogen and carbon dioxide together with any other uncondensable gases. Low boiling condensate is removed from receiver 11 through drainpipe 13. An intermediate boiling range fraction condensed in fractionator 8 may be withdrawn as a side stream through line 14. Water condensate is removed from the separation zone 8 through line 15. Excess water is eliminated through line 16 while remaining portions of this water condensate still under heated condition may be used as will be explained for emulsion breaking and as make-up water in the aqueous treating solution.

During the period of soaking and reaction of the macerated carbohydrate material mixed with hot aqueous alkaline solution in the reaction chamber 1, a portion of the reaction mixture is withdrawn continuously or periodically through line 17 into a separating vessel 18. The mixture withdrawn from chamber 1 into vessel 18 may be mixed with hot water condensate received through line 15 from the separator 8. By admixing the hot water condensate, emulsions of oily organic reaction products with the used aqueous alkaline solutions are broken.

The used aqueous alkaline solution separated in vessel 18 is passed or decanted through line 19 into the regeneration chamber 20, wherein under lowered pressure, bicarbonate in the solution is decomposed to evolve carbon dioxide and thus form the normal carbonate in the solution. The carbon dioxide gas evolved may be passed overhead from chamber 20 to line 21 into separator 8 for recovery of entrained low boiling organic compounds which might remain in the aqueous layer withdrawn from the separation vessel 18. In the regeneration, the aqueous solution may be maintained at a temperature of about 100–200° C. at about atmospheric pressure or a pressure of a few atmospheres. A heat exchange coil 22 disposed in the bottom part of chamber 20 may be used for adding heat and controlling temperature in the regeneration.

The regenerated carbonate solution is withdrawn from chamber 20 by pump 23 in line 24 and is recycled by pump 26 in line 27 through heating coil 4 to the reaction chamber 1, to supply hot aqueous alkaline solution required in maintaining the temperature and alkalinity requirements as the reaction is proceeding toward completion. Portions of this regenerated solution may be fed through line 25 to the mixing tank 2 for use in preparing a fresh charge, or may by-pass the heater in being recycled through line 31 for cooling the mixture in reactor 1.

As a final stage of reaction is reached, the reaction product is withdrawn from the reaction chamber 1 through line 17 into the separating vessel 18 wherein oily emulsions are broken, and the oily products separated may be withdrawn from top and bottom layers through lines 30 and 28.

With the apparatus arrangement and procedure described, the operation may be carried out in a semi-continuous manner or a continuous manner, which has practical advantages. In starting the operation, the charge is preheated and fed at a controlled rate into reaction chamber 1, which acts as a soaking drum. Near the end of the charging period and while the reaction is in an initial stage, a stream of the reaction mixture may be withdrawn from the reaction zone in chamber 1 to the liquid separation zone in vessel 18, then be returned by way of lines 29, 24, 27, and heating coil 4 to the reaction chamber after separation of spent alkaline solution until a final stage recovery of pyrobituminous material is made by withdrawing the product through line 28. When the partly digested or reacted mixture is not being recycled, regenerated alkaline solution continues to be recycled through line 24 from chamber 20 during the final stage of reaction.

In a continuous operation, the feed mixture at the beginning of a run is brought up to a temperature needed for initiating reaction in a starting heater, then heat may be supplied by heat exchange from the reaction products. The entire reaction mixture may be passed through the reaction zone, thence through heat exchangers to a separator for separating spent aqueous alkaline solution.

As an example of an industrial scale conversion, the following analysis of requirements is given for conversion of shredded raw sugar cane. A charge of 2250 tons/day shredded carbohydrate (containing 25% moisture) with 1810 tons/day sodium carbonate and 5150 tons/day water at an initial mixer temperature of 98° C. can be preheated by heat exchange with reaction products to a reaction initiating temperature of between 280° C. and 300° C. This preheated charging stock passed continuously into a reaction chamber for about 30 minutes' residence time may be allowed to increase in temperature up to 370° C., or close to the critical temperature of water (374° C.) under a pressure of 200 atmospheres or higher. The resulting reaction mixture and product stream leaving the reaction chamber makes available a large amount of heat that can be utilized in the system. The product stream containing the spent aqueous alkaline solution decreased in alkalinity by absorbed carbon dioxide split off in the reaction of the carbohydrate material may be passed through any number of heat exchange and cooling stages desired in being conducted to a separator, where the oily decomposition product is separated, and whence the spent aqueous alkaline solution is passed to the regeneration zone. A yield of hydrogenatable carbonaceous material close to 800 tons/day is obtainable with the charging rate described.

The following table indicates the results obtained by operations run in the described manner:

TABLE I

Formation of a pyrobituminous pitch from cellulose

Conditions:
    1 part by weight dry cellulose to 5 parts alkali solution
    1N-NaOH; 2 hours' soaking at 310–330° C. at up to 200 atm. pressure Elementary composition of cellulose:

| | Per cent |
|---|---|
| Carbon | 44 |
| Hydrogen | 6 |
| Oxygen | 49 |

Yield of pyrobituminous pitch _____ 34

Elementary composition of pyrobituminous pitch:

| | |
|---|---|
| Carbon | 79 |
| Hydrogen | 9 |
| Oxygen | 10 |
| Ash | 2 |

The pyrobituminous substances are of unsaturated character, contain acidic materials, naphthenes and hydroxyl groups. These substances upon pyrolysis become converted into commercially useful bituminous products.

It should be noted from Table I how the elementary composition of the product differs from the carbohydrate starting material. Table II indicates the similarity between naturally occurring asphalts and a bituminous product obtained by destructive distillation of the pyrobituminous product.

TABLE II

Composition of bituminous product compared to natural asphalt

| | Percentage Carbon | Percentage Hydrogen | Percentage Oxygen |
|---|---|---|---|
| Natural Asphalt | 86 | 9 | 3 |
| Yield from Table I | 89 | 8 | 3 |

The pyrobituminous substances obtained above can be made to further resemble natural asphalts by further heating and distillation. They may be subjected to destructive hydrogenation to obtain mainly naphtha, fuel oils, and lubricating oils. The savings in cost of treating material and increased yields of product obtained make the advantages of this invention discernible. Various waste plant materials, such as corn stalks, sawdust, moss, seaweed, raw sugar, cane waste or bagasse, molasses residue, peat, and the like may be used as inexpensive carbohydrate starting materials.

In the alkaline heating solution other alkaline reacting substances, substances having a buffer action, and substances that have a catalytic action, may be used. Substances such as calcium carbonate, iron sulfide, zeolites, and calcium oxide may thus be used dissolved and/or suspended in the treating solution.

The invention has been described with reference to preferred modification and adaptations, but it is to be understood that other modifications come within the scope of the invention as defined in the appended claim.

I claim:

In a process of converting cellulosic material to a pyrobituminous pitch by reaction with an aqueous alkali metal carbonate solution, the improvement which comprises charging a batch of said cellulosic material for an initial period to a reaction zone to form a reaction mixture therein with aqueous alkali metal carbonate solution, retaining the charged cellulosic material in said reaction zone for a residence period of at least 30 minutes at temperatures between 300° C. and 374° C. under a sufficient superatmospheric pressure to maintain a substantial amount of the water in the liquid phase; during the residence period of said batch of cellulosic material in the reaction zone, withdrawing a resulting liquid mixture of oily conversion products with used aqueous solution decreased in alkalinity by formation of alkali metal bicarbonate from a bottom part of said reaction zone while retaining the unconverted portion of the batch of cellulosic material in said reaction zone; separating oily liquid conversion products from the thus withdrawn spent aqueous solution of the alkali metal bicarbonate; passing the thus separated used aqueous solution into a regeneration zone wherein the alkali metal bicarbonate is converted to normal alkali metal carbonate with evolution of carbon dioxide; and recycling the regenerated normal alkali metal carbonate solution from the regeneration zone to the reaction zone for further reaction of the portion of the cellulosic material retained therein under reaction conditions in order to maintain the alkaline solution contacted with the cellulosic material at high alkalinity until the remaining portion of the batch of cellulosic material supplied to the reaction zone are substantially converted into oily liquid decomposition products.

EGER V. MURPHREE.

REFERENCES CITED

The following references are of record in the file of this patent:

UNITED STATES PATENTS

| Number | Name | Date |
|---|---|---|
| 2,177,557 | Bergstrom et al. | Oct. 24, 1939 |
| 2,205,962 | Reich | June 25, 1940 |

FOREIGN PATENTS

| Number | Country | Date |
|---|---|---|
| 114,878 | Australia | June 11, 1942 |

OTHER REFERENCES

Berl: "Bull. Am. Assoc. Petroleum Geol.," vol 24 (1940), pages 1865–1890.